June 30, 1953 W. H. NEFF 2,643,798
DISPENSING AND DISTRIBUTING FOR FINELY DIVIDED MATERIALS
Filed March 13, 1950
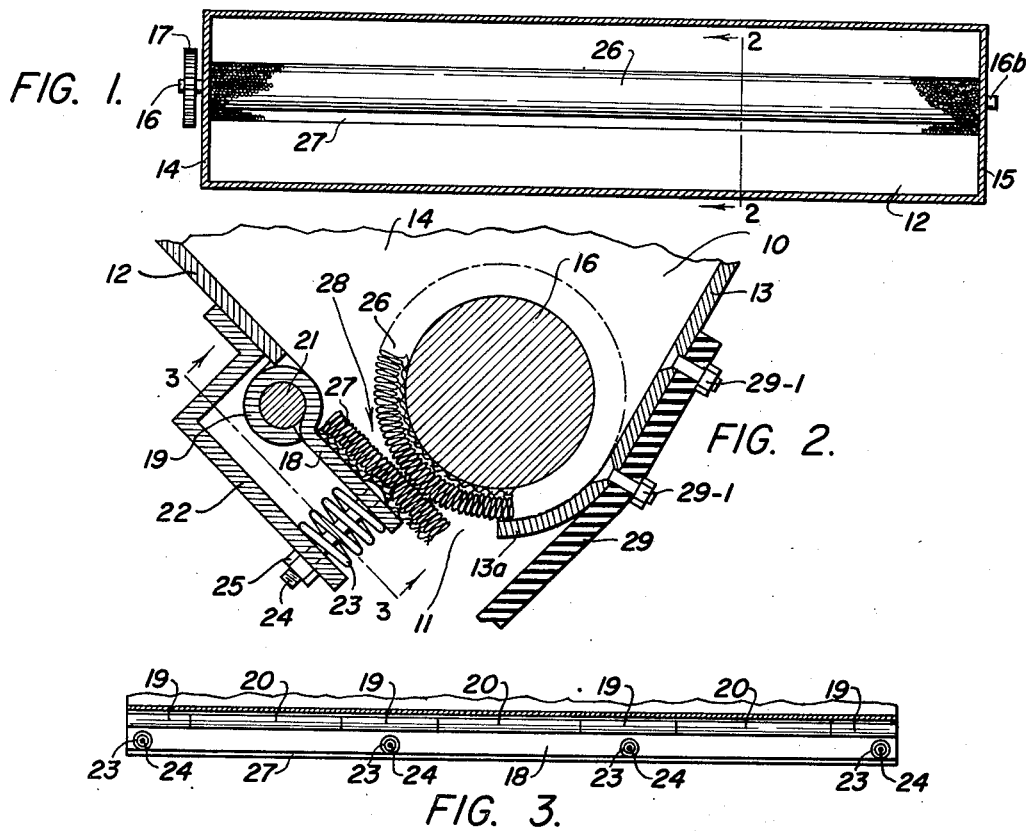
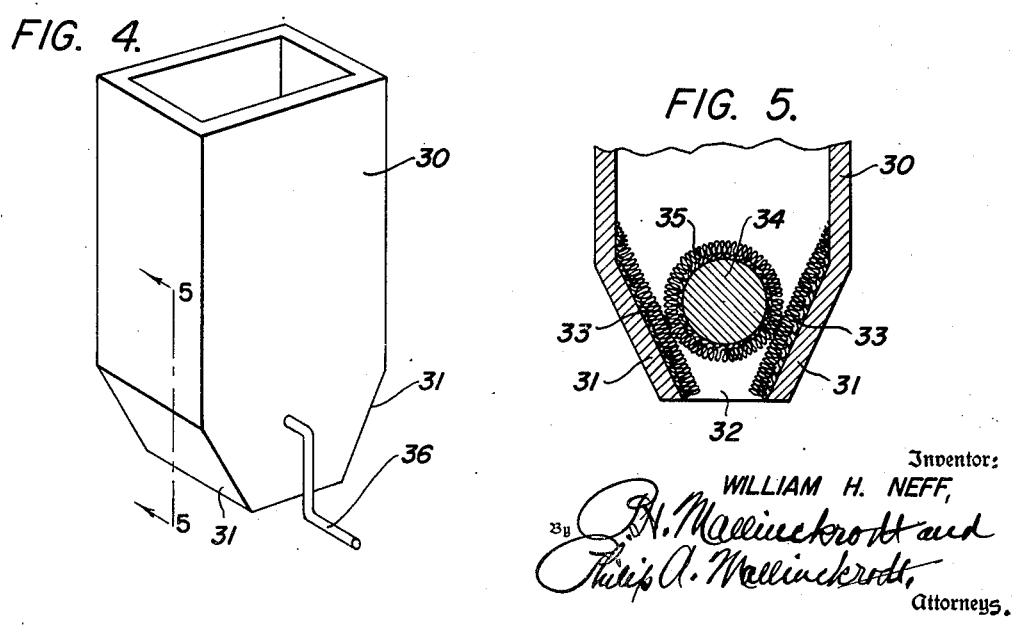
Inventor:
WILLIAM H. NEFF,
Attorneys.

Patented June 30, 1953

2,643,798

UNITED STATES PATENT OFFICE 2,643,798

DISPENSING AND DISTRIBUTING DEVICE FOR FINELY DIVIDED MATERIALS

William H. Neff, Salt Lake City, Utah

Application March 13, 1950, Serial No. 149,237

10 Claims. (Cl. 222—313)

This invention relates to devices for dispensing and distributing finely divided materials, as in the planting of seeds, the application of chemical fertilizers to agricultural areas, the dispensing of soap powder, granules, or flakes, and the dispensing of a variety of other materials of generally similar nature from a hopper or other container. The present application constitutes a continuation in part of a prior application, Serial No. 569,235, filed by me December 21, 1944, entitled "Distributors," now abandoned.

Considerable difficulty has heretofore been experienced in the mechanical dispensing and distributing of finely divided materials from a massed supply of same. There has been much waste of materials, and distribution has been spotty. This has been particularly true in the spreading of grass seeds during the planting of lawns, and, similarly, in the spreading of chemical fertilizers over agricultural areas. Most of such spreading operations require even distribution of the material concerned, to not only prevent waste of such material, but, also, to insure proper results from its application. Careful control of the dispensing operation is important wherever finely divided materials are handled.

Accordingly, a principal object of the present invention is to provide a device for dispensing and distributing finely divided materials under more precise and accurate control than is ordinarily possible.

Other objects are:

To provide the above by a simple construction low in cost.

To provide a device for the purpose which is easily operated and not likely to get out of order.

To provide a construction which may vary considerably in size and capacity, depending upon the particular use to which it is put.

To provide particularly for uniform dissemination and accurate control in the mechanical seeding of lawns and in the mechanical spreading of chemical fertilizers.

In accomplishing these objects of the invention, I utilize a pile material in combination with and as a covering for a material-dispensing roller and a non-rotatable reaction member against which the roller rotates. The pile material thus becomes the distributing agency in the device. The finely divided material to be distributed is fed between the pile-covered roller and reaction member in the direction of rotation of the roller, whereby the interengagement and wiping action of the rotating piles relative to the non-rotating piles effect a very uniform distribution of the finely divided material throughout the discharge from the device.

As most commonly employed, the finely divided material is fed between the pile-covered roller and reaction member by gravity from a massed supply of same maintained in a hopper forming a part of the device. The roller and reaction member are operably positioned across the bottom discharge opening of the hopper, where they effectively close such discharge opening and prevent discharge of the material except when the roller is rotating.

It is preferred that the pile-covered reaction member be resiliently mounted to accommodate the passage of any large pieces of foreign matter which might be inadvertently mixed with the finely divided material to be distributed, and that such mounting be arranged so that the pile-covered reaction member is adjustably urged toward and against the circumferential working surface of the pile-covered roller to provide for the dispensing of a lesser or greater quantity of the material per unit time or per unit distance traveled by the device. Control of the quantity of the material dispensed per unit time or per unit distance may also be attained by varying the speed of rotation of the roller.

Further objects and features of the invention will be apparent from the following detailed description of the presently preferred embodiments illustrated in the accompanying drawing to exemplify the generic inventive concepts set forth in the broader of the claims appearing herebelow.

In the drawing:

Fig. 1 represents a top plan view of a dispensing and distributing device constructed in accordance with the invention, primarily for the purpose of distributing grass seed in the planting of lawns, or of spreading chemical fertilizers over agricultural areas, the device including a hopper which is illustrated only fragmentarily;

Fig. 2, a transverse vertical section taken on the line 2—2 of Fig. 1 and drawn to a considerably enlarged scale;

Fig. 3, a longitudinal section taken on the line 3—3 of Fig. 2 and drawn to the scale of Fig. 1;

Fig. 4, a perspective view of one type of soap dispenser constructed in accordance with the invention; and Fig. 5, a fragmentary vertical section taken on the line 5—5 of Fig. 4.

Referring to the drawing:—the embodiment of Figs. 1, 2, and 3 is intended particularly for use in the distributing of grass seed over an area to be planted in lawn, or in the spreading of chemical fertilizer thereover or over other broad agricultural areas. It comprises a hopper 10 for containing a supply of the grass seed or chemical fertilizer or other finely divided material to be distributed. Such hopper 10 may be constructed in any suitable manner consistent with the feeding of the finely divided material downwardly by gravity to the elongate discharge opening 11 formed along the bottom of the hopper. As illustrated, the hopper 10 has two opposite longitudinal walls 12 and 13 which are joined by opposite end walls 14 and 15 and converge downwardly to respective terminations defining the discharge opening 11. It is preferred, but not necessary, that one of such longitudinal walls, here shown as the wall 13, terminate at its lower end in an arcuate lip, see 13a, to effect a more positive closure at the one side of the discharge opening 11, as will hereinafter appear. The lower edge of the opposite wall, 12, is spaced apart sufficiently far from the lip 13a, in defining the discharge opening 11, to accommodate the discharge roller and coacting reaction member of the device.

The discharge roller is at least as long as the discharge opening, and may be solid or hollow depending upon the material from which it is made. As illustrated, a solid discharge roller 16 of wood or similar relatively light material is rotatably mounted above the discharge opening 11, as by means of stub shafts 16a and 16b journaled within the end walls 14 and 15 of the hopper. As so mounted, the roller 16 is concentric with the lip 13a, and coacts therewith in providing the positive closure mentioned above.

Roller 16 may be rotated in any suitable manner, for example by means of a sprocket wheel 17 fixed to the protruding end of stub shaft 16a and driven by a sprocket chain receiving its motion through any suitable and well known drive arrangement (not shown). It should be noted that for the purposes intended, hopper 10 may be mounted in any suitable manner (not shown) on a pair of wheels, or on the chassis of a vehicle, for travel over the area concerned. Such wheeled assembly may be provided with a handle and pushed or pulled by hand in a manner common and well known in hand-operated seeders or fertilizer spreaders, or may be arranged as a trailer for attachment to a tractor or other vehicle. Again, it may be a part of an animal-drawn or of a power-driven machine. In any of these instances, it is desirable that the sprocket wheel 17 be driven through suitable drive connection with the road wheels, so that rotation of the roller 16 will be coincident with travel of the device and at a rate of speed correlated with the speed of travel across the agricultural area concerned. There may be interposed in any such drive arrangement standard means for varying the drive ratio, so that the speed of rotation of the roller relative to the road wheels may be varied, thereby providing for control of the quantity of discharge per unit distance traveled by the device. Such arrangements are well known in the art, and need not be detailed here.

The reaction member is positioned within the discharge opening 11 adjacent and in opposition to the roller 16. It is non-rotatable, that is to say non-traveling relative to the roller, and is in fact stationary except for whatever motion radially of the roller is permitted when mounted resiliently. As illustrated, the reaction member preferably takes the form of an elongate plate 18, which is pivotedly attached along one of its longitudinal edges to the hopper structure. For this purpose, the lower margin of the wall 12 of the hopper is turned outwardly on itself to form spaced hinge members 19, between which are received similar hinge members 20 of the reaction plate 18. A hinge pin 21 extends through the aligned hinge members 19 and 20.

In the illustrated embodiment, the reaction plate 18 is resiliently mounted and resiliently urged against the roller 16. For this purpose, an elongate bracket structure, including a plate 22 is secured, as by welding, to the longitudinal wall 12 of the hopper so as to depend in spaced opposition to the reaction plate 18. Coil springs 23 are interposed between such bracket plate 22 and the reaction plate 18 at spaced intervals along the lengths thereof, see Fig. 3. Such springs 23 surround respective bolts 24, which, by means of their nuts 25, provide for adjusting the degree of adjacency of the reaction plate 18 relative to the roller 16, and the degree of pressure of the covering of the former against the covering of the latter.

Both the roller 16 and the reaction plate 18 have their opposing, working surfaces covered by a pile material, which is fixed thereto, as by gluing or tacking. Such pile material may be of various kinds, so long as a mat composed of upstanding, closely set, flexible fingers is provided. An excellent pile material for the purpose is a woolen twist-weave broadloom carpet having a pile of approximately one-quarter to three-quarters of an inch in length. This is superior to ordinary pile fabrics, since the twisted piles stand up better under hard use, and have a superior distributing action on the finely divided material. Nevertheless, pile fabrics in general, such as velvet, may be utilized, as may other pile materials, such as fur. In some instances, especially where hygroscopic materials such as certain chemical fertilizers are being distributed, a special pile material similar to the aforestated twist-weave carpet, but having the individual piles waterproofed, as by rubberizing, or even made of a flexible but relatively non-elastic rubber or rubber substitute, such as a flexible plastic material, may be employed.

The roller 16 is illustrated as covered with a high pile, twist-weave, broadloom carpet 26, while the reaction plate 18 is shown covered with a strip 27 of the same material. By reason of the positioning of the reaction plate in close adjacency to the roller, the piles of covering 27 are pressed against, and, in effect, interengage with, the piles of covering 26. As the roller 16 rotates, the piles of its circumferential covering 26 wipe against the substantially stationery piles of the covering 27 of the non-rotatable reaction plate 18. This wiping action of the one pile material against the other is responsible for the superior distributing action of the device of the invention. Furthermore, the depths of the opposing pile materials effectively accommodate different sized particles within the same group of particles without appreciably affecting accuracy of material distributions. This is of considerable importance in the planting of lawns, where small and elongate grass seed are intermixed with relatively large and round clover seed.

The drive mechanism for roller 16 is arranged to rotate such roller counterclockwise in the showing of Fig. 2, that is to say, toward the reaction member in the direction of discharge of the material. Thus, massed finely divided material within hopper 10 which bears down upon the discharge arrangement above-described, is swept into the downwardly-convergent, funnel-like zone 28 defined between the pile coverings 26 and 27, and is wiped over the piles of covering 27 by the piles of covering 26 in the direction of rotation of the roller to provide a very even and uniform discharge through the discharge opening 11 of the hopper.

A downwardly directed baffle plate 29 may be secured to the lower portion of the longitudinal wall 13 in any suitable manner, as, for example, by bolts 29—1, for protecting and directing the discharge of finely divided material. Such baffle plate 29 preferably extends to within an inch or two of the ground surface in the uses specified, and is preferably a piece of heavy rubber belting or the like so as to have sufficient rigidity for its intended purpose and yet sufficient resiliency to be deflected without injury by stones or other obstacles on the ground.

That the device of the invention is capable of assuming a variety of different forms and of being used for dispensing a variety of different finely divided materials is indicated by the second embodiment here disclosed. Such embodiment, illustrated in Figs. 4 and 5, may be effectively employed as a soap dispenser. It comprises a hopper-like receptacle 30 having a pair of opposite, downwardly and inwardly sloping, bottom walls indicated 31, respectively, converging to define a bottom discharge opening 32. The inner surfaces of both of such walls 31 are covered with a pile material 33.

Extending along the length of discharge opening 32, intermediate the convergent bottom walls 31, is a roller 34, which is circumferentially covered with a pile material 35. The roller 34 is so placed that the circumferential pile covering 35 thereof is in close engagement with the pile coverings 33 of the respective walls 31. Accordingly, such walls 31 serve as reaction members relative to the roller.

A crank 36 is attached to one end of the roller 34, so that such roller may be easily turned by hand. It should be noted that, because of the pair of oppositely disposed reaction members 31, both coacting with the roller 34, the hand crank 36 may be turned in either direction to dispense soap powder, granules, or flakes, or any other finely divided material within the container 30.

From the above, it will be apparent that the length given to the roller in any given instance depends upon the use to which the device is to be put, and that, for certain uses, its length will be shorter than for others. In fact, the roller may be so short as to be termed a disk, and the reaction member of length corresponding to the width of the rim thereof, as, for example, in instances where row crops are to be planted or fertilized, and, in such instances, the device of the invention may be assembled side-by-side in gang arrangement in well known manner for handling several rows at once.

Furthermore, it is obvious that the roller may take various different forms other than cylindrical, for example, the form of a sphere or hemi-sphere, and that the reaction member or members will be formed to mate and coact therewith.

While I prefer to cover both the discharge roller and the reaction member with a pile material, since the piles of the reaction member against which the piles of the roller wipe during the discharge form a multitude of downwardly-directed friction channels through which the finely divided material is pushed or brushed by the piles of the roller, reasonably satisfactory results can be achieved by utilizing a covering of pile material for the roller and merely a friction surface, such as is provided by felt, cloth, or other substantially non-slippery textile or other material, for the reaction member.

Whereas this invention is here shown and described with respect to certain preferred and illustrative embodiments thereof it is to be understood that various changes may be made therein and various other forms may be constructed on the basis of the teachings hereof, by those skilled in the art, without departing from the protective scope of the claims which here follow.

I claim:

1. In a dispensing and distributing device for finely divided materials, said device having a rotatably mounted roller, substantially stationary reactions means disposed in close adjacency to the circumferential surface of said roller and being substantially coextensive in length therewith, means for rotating said roller toward said reaction means, and feed means for supplying finely divided materials between said roller and said reaction means in the direction of rotation of the roller, pile material covering the circumferential surface of the roller in fixed relationship therewith, and pile material covering opposing surface areas of the reaction means in fixed relationship therewith, the pile material of the roller engaging that of the reaction means and wiping across the latter as the roller rotates.

2. The combination recited in claim 1, wherein the individual piles of the pile materials are twisted.

3. The combination recited in claim 1, wherein the pile materials are pile fabric.

4. The combination recited in claim 1, wherein the pile materials are twist-weave, broadloom carpeting.

5. The combination recited in claim 1, wherein the reaction means comprises a pair of pile-covered reaction members disposed at respectively opposite sides of the roller.

6. A dispensing and distributing device for evenly discharging finely divided materials, comprising a hopper having a discharge opening at its bottom; a roller rotatably mounted at the bottom of the hopper longitudinally of the discharge opening thereof to close off the discharge therefrom; a pile covering for said roller; and a strip of like material attached to the side of the hopper toward which the roller rotates, the pile of said roller-covering and of said strip being interengaged, and the discharge of material from the hopper which occurs between said roller-covering and said strip being controlled by said interengaging piles.

7. A dispensing and distributing device for finely divided materials, comprising a hopper having a discharge opening at its bottom; a roller rotatably mounted at the bottom of said hopper, longitudinally of the discharge opening thereof and contacting opposite longitudinal sides of the hopper to hold the material therein and to discharge said material from along one side of said hopper; a pile covering for said roller; and a strip of like material along the discharge side of the hopper toward and against which the roller rotates when discharging.

8. A device as recited in claim 6, including a spring means pressing the strip of material against the covering of the roller.

9. A dispensing and distributing device for finely divided materials, comprising a hopper having sidewalls tapering toward a common discharge, one of said sidewalls being curved inwardly across the discharge opening, limiting the discharge to one side of the opening; a pivoted discharge control plate mounted alongside the opposite sidewall and along the discharge opening; spring means pressing the plate inwardly and affording adjustment of the pressure of the plate; a distributor roller mounted longitudinally of the hopper and across the discharge opening thereof, the circumferential surface of the roller being covered with pile material, and the curvature of the said curved sidewall of the hopper at the discharge being concentric with the cylinder; and a like pile material covering the surface of the discharge control plate, the two pile surfaces being adapted to work together as the roller is rotated, to feed material through the discharge space between the roller and discharge control plate, thereby insuring even distribution of the material from the hopper in predetermined quantity.

10. In a dispensing and distributing device for finely divided materials, a discharge roller having its circumferential surface covered with a pile material; a substantially stationary reaction member having a friction surface disposed against the pile covering of said roller and over which said pile covering wipes as the roller rotates; means for rotating said roller; and means for feeding finely divided materials between said pile covering and said friction surface in the direction of rotation of the roller.

WILLIAM H. NEFF.

References Cited in the file of this patent

UNITED STATES PATENTS

| Number | Name | Date |
|---|---|---|
| Re. 3,278 | Stevens et al. | Jan. 26, 1860 |
| 1,736,124 | Meijer | Nov. 19, 1929 |
| 1,849,901 | Anderson | Mar. 15, 1932 |
| 1,894,058 | Rice | Jan. 10, 1933 |
| 2,329,666 | Syverud | Sept. 14, 1943 |